US012344170B2

(12) United States Patent
Mainiero

(10) Patent No.: US 12,344,170 B2
(45) Date of Patent: Jul. 1, 2025

(54) EMBLEM MODIFICATION SYSTEM AND METHOD

(71) Applicant: Joe Mainiero, Lake Worth, FL (US)

(72) Inventor: Joe Mainiero, Lake Worth, FL (US)

( * ) Notice: Subject to any disclaimer, the term of this patent is extended or adjusted under 35 U.S.C. 154(b) by 177 days.

(21) Appl. No.: 18/241,857

(22) Filed: Sep. 2, 2023

(65) Prior Publication Data

US 2025/0074334 A1    Mar. 6, 2025

(51) Int. Cl.
*B60R 13/00* (2006.01)
(52) U.S. Cl.
CPC .................. *B60R 13/005* (2013.01)
(58) Field of Classification Search
CPC .................................................. B60R 13/005
See application file for complete search history.

(56) References Cited

U.S. PATENT DOCUMENTS

| 9,849,844 | B2* | 12/2017 | Hannel | B60R 13/005 |
|---|---|---|---|---|
| 2003/0079382 | A1* | 5/2003 | Arens | B60R 13/005 |
| | | | | 40/210 |
| 2006/0023468 | A1* | 2/2006 | Takahashi | B60R 13/005 |
| | | | | 362/555 |
| 2006/0125262 | A1* | 6/2006 | Elwell | B60R 13/00 |
| | | | | 296/1.08 |
| 2006/0186681 | A1* | 8/2006 | Elwell | B60R 13/00 |
| | | | | 296/1.08 |
| 2021/0276496 | A1* | 9/2021 | Fattouche | B60R 13/00 |

* cited by examiner

*Primary Examiner* — Gary C Hoge
(74) *Attorney, Agent, or Firm* — Uradnik Law Firm PA

(57) ABSTRACT

An overlay emblem is provided to alter the appearance of an existing emblem, wherein the overlay emblem includes on its back or bottom side recesses which match a portion of the existing emblem, so that placement of the overlay emblem over the existing emblem forms a composite emblem with an appearance different from the appearance of the existing emblem.

2 Claims, 3 Drawing Sheets

EMBLEM MODIFICATION SYSTEM AND METHOD

FIELD OF THE DISCLOSURE

The invention relates generally to a system and method for altering the appearance of an emblem, and more particularly in one specific embodiment, to an overlay emblem including a bottom surface that is contoured for placement over a portion of another emblem (e.g., an emblem attached to an automobile), to create a new emblem appearance.

BACKGROUND

Most automobiles include at least one emblem affixed to their bodies. Frequently, those emblems are affixed to the rear of the car or to a front quarter panel, although other positioning is possible. Automobile emblems typically are affixed to the surface of a car using an adhesive (glue, silicone, etc.).

If an automobile owner desires to change an existing emblem, it can be difficult and time-consuming to remove the existing emblem and provide a replacement. Such difficulties are encountered even where a replacement emblem appears as a minor variation of an existing emblem. Thus, there remains a need for an improved system and method of altering the appearance of an automobile emblem.

SUMMARY

The present disclosure provides in one specific embodiment an overlay emblem including a bottom or backing portion contoured for placement over a portion of an existing emblem. The bottom or backing portion of the overlay emblem thus includes at least a first section adapted to fit over a portion of an existing emblem mounted on an automobile surface, and a second section adapted to be secured to the automobile surface to which the existing emblem is mounted. In that way, a composite emblem may be created which has a different appearance than the existing emblem. The new appearance of the composite emblem is created without having to remove the existing emblem from the automobile surface. The overlay emblem may be held in place with an adhesive placed between the overlay emblem and the automobile surface, and/or an adhesive placed between the overlay emblem and the existing emblem.

Other benefits and advantages of the present disclosure will be appreciated from the following detailed description.

DETAILED DESCRIPTION

Figure 1:
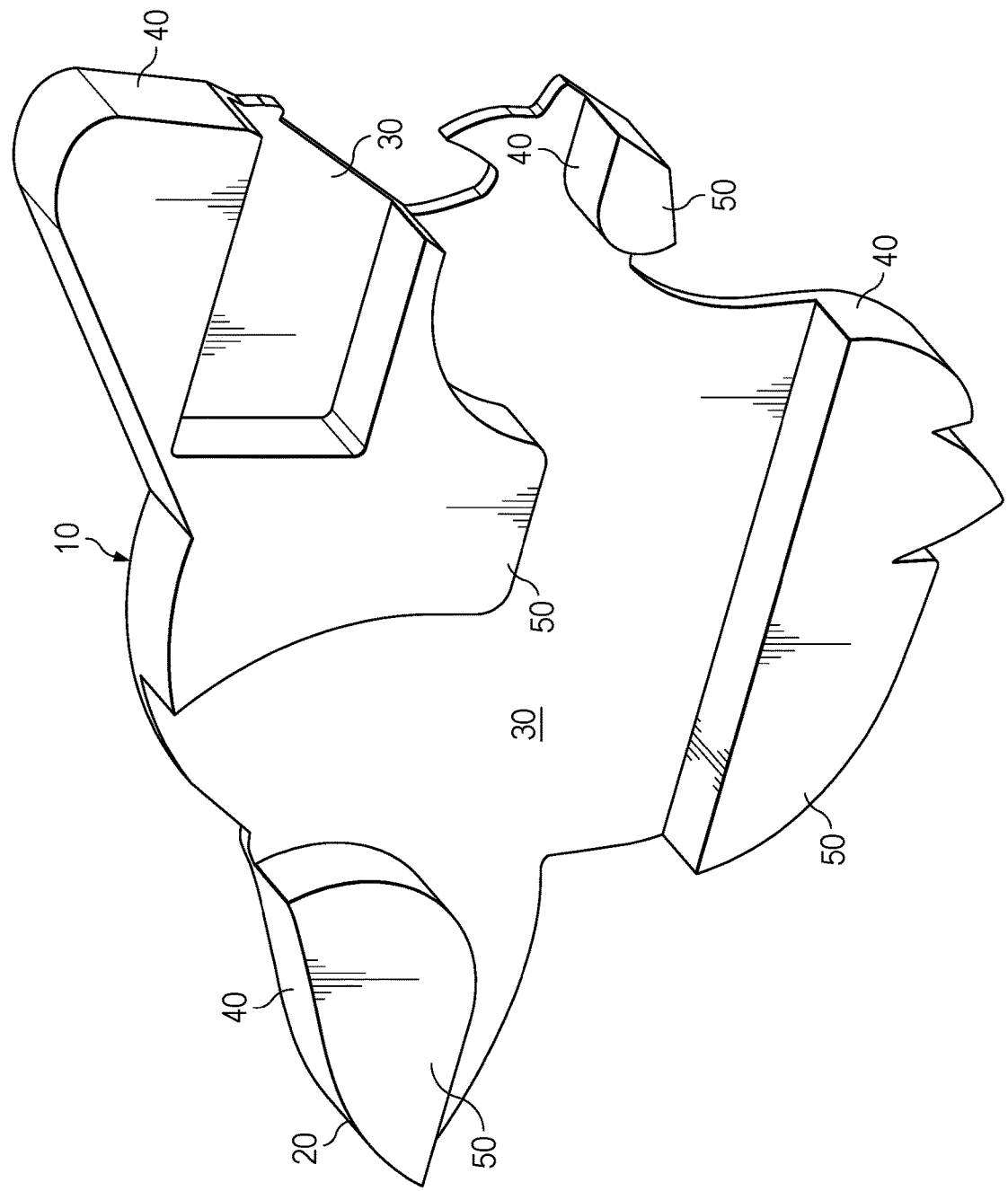
FIG. 1 is a perspective view from the rear of an exemplary overlay emblem in accordance with one exemplary embodiment of the invention.

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described: events occurring related to emblem use; etc. Such aspects related to this disclosure do not depart from the invention, and it is therefore intended that the invention not be limited by the certain aspects set forth of the events and circumstances related to this disclosure.

For clarity and convenience only, the present disclosure is directed to emblems placed on automobiles: however, the invention is not so limited. Other types of emblems (e.g., emblems on motorcycles, on watercraft, on other surfaces, etc.) may be used.

The present disclosure in one embodiment provides an overlay emblem 10. The overlay emblem 10 includes a back or bottom portion 20 that is contoured. A recess 30 may be provided in the back or bottom portion 20 of the overlay emblem 10. One or more recesses 30 may be provided. In one embodiment, the non-recessed portions 40 may provide a generally flat rearward facing surface 50.

Figure 2:
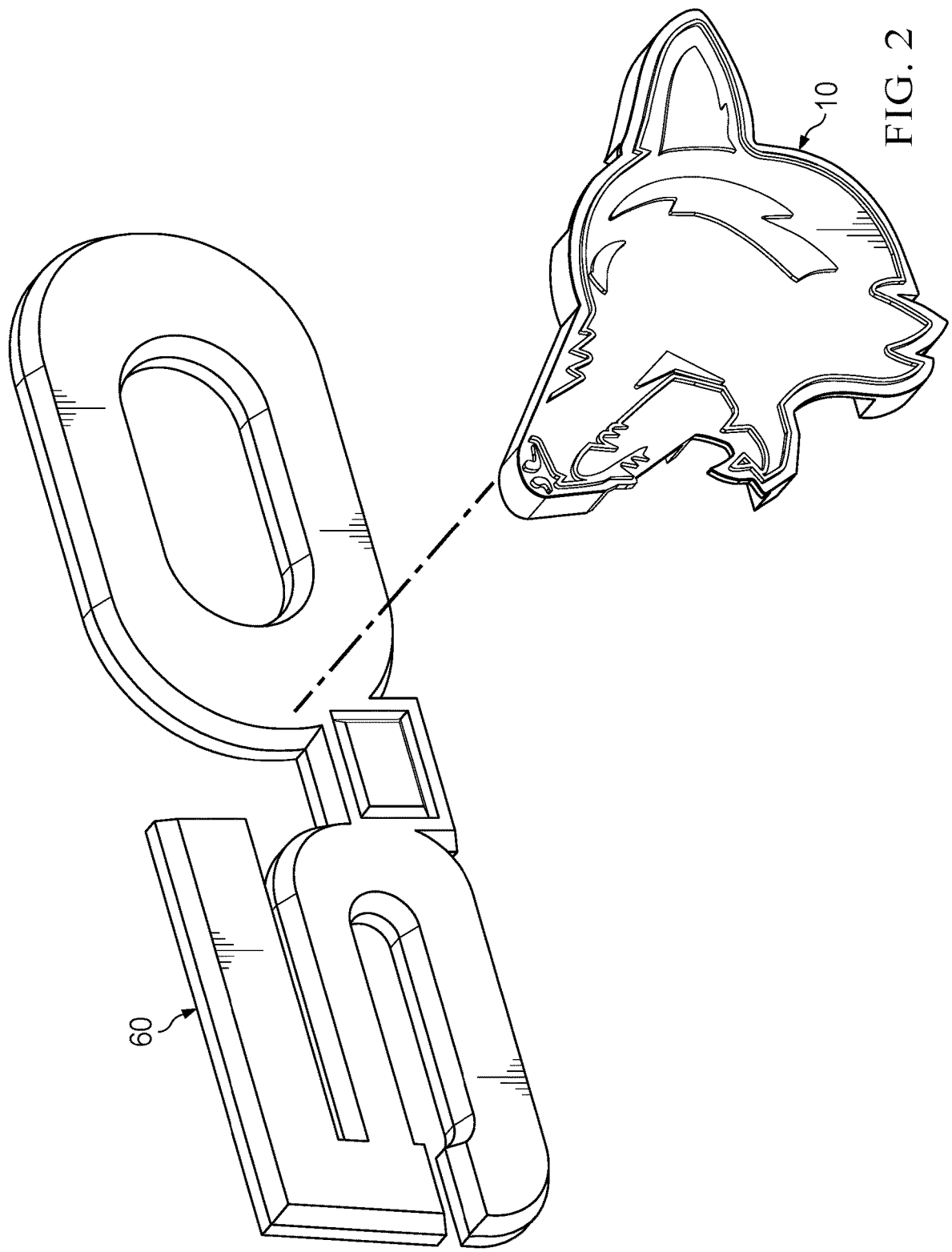
FIG. 2 is a perspective exploded view of the positioning of the exemplary overlay emblem with an exemplary existing emblem.
Figure 3:
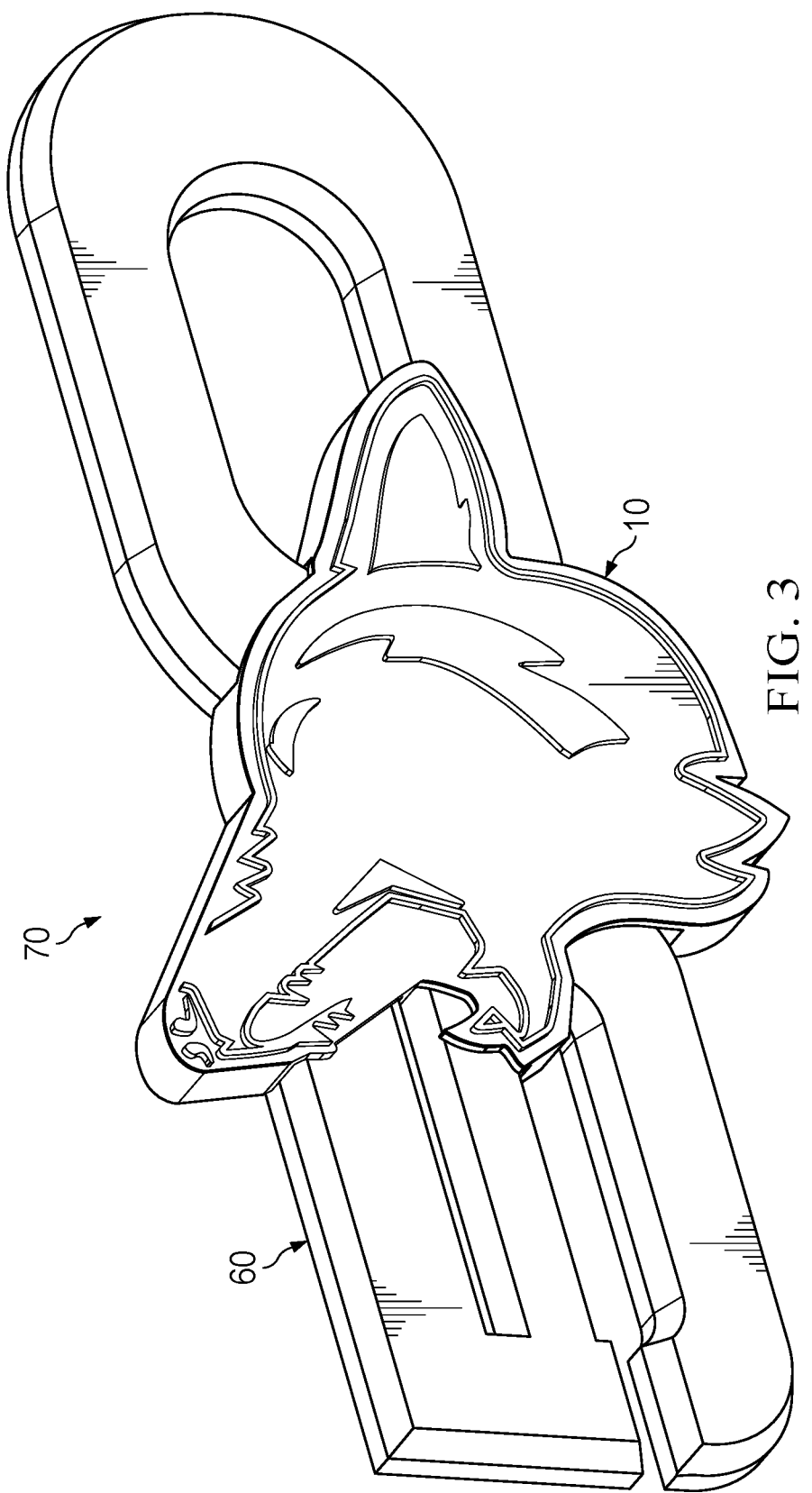
FIG. 3 is a perspective view of an exemplary composite emblem including the overlay emblem shown in FIG. 1.

The recesses 30 may be formed to match a raised portion of an existing emblem 60. In that way, the overlay emblem 10 may be placed over a portion of the existing emblem 60. See FIG. 2. The resulting composite emblem 70 (see FIG. 3) thus has a different appearance than the existing emblem 60 due to the addition of the overlay emblem 10.

In one embodiment, the surfaces 50 will correspond with the rear surface of the existing emblem 60. In that way, adhesive may be used to attach both the surfaces 50 and the rear surface of the existing emblem 60 to a single surface (e.g., the front quarter panel of an automobile). In addition, adhesive placed in the recesses 30 may adhere the overlay emblem 10 to the existing emblem 60.

Thus, a method is provided for altering the appearance of an existing emblem. The method comprises the steps of providing an overlay emblem including back or bottom side recesses matching the shape of a portion of the existing emblem; and adhering in place the overlay emblem over the existing emblem to form a composite emblem with an appearance that differs from the existing emblem. In one embodiment, the method includes the step of adhering the non-recessed surfaces of the back or bottom side of the overlay emblem to portions of the surface upon which and adjacent to which the existing emblem is mounted.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. A method of providing a composite emblem formed from an existing emblem mounted on a first surface portion and an overlay emblem mounted on second surface portion adjacent the first surface portion, the method including the steps of providing the overlay emblem including one or more recesses that match a portion of the existing emblem, so that the overlay emblem may be adhered over the portion of the existing emblem at the overlay emblem recesses to create a composite emblem appearance that differs from the appearance of the existing emblem.

2. An overlay emblem including a back side comprising both a recessed portion and a non-recessed portion, wherein the recessed portion matches a profile of a portion of an existing emblem that is mounted to a first portion of an existing surface, so that the non-recessed portion of the overlay emblem may be adhered to a second portion of the existing surface adjacent to the first portion of the existing surface to which the existing emblem is mounted.

* * * * *